(12) United States Patent
Novik et al.

(10) Patent No.: US 7,440,981 B2
(45) Date of Patent: Oct. 21, 2008

(54) SYSTEMS AND METHODS FOR REPLICATING DATA STORES

(75) Inventors: Lev Novik, Bellevue, WA (US); Irena Hudis, Bellevue, WA (US); Douglas B. Terry, San Carlos, CA (US); Ashish Shah, Sammamish, WA (US); Sanjay Anand, Sammamish, WA (US); Yunxin Wu, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 917 days.

(21) Appl. No.: 10/631,591

(22) Filed: Jul. 31, 2003

(65) Prior Publication Data

US 2005/0086272 A1 Apr. 21, 2005

(51) Int. Cl.
*G06F 17/30* (2006.01)
(52) U.S. Cl. .................. 707/204; 707/200; 707/205
(58) Field of Classification Search .......... 707/201, 707/200, 204, 205; 709/219
See application file for complete search history.

(56) References Cited

U.S. PATENT DOCUMENTS

| | | | | |
|---|---|---|---|---|
| 4,408,273 | A * | 10/1983 | Plow | 707/202 |
| 5,438,674 | A * | 8/1995 | Keele et al. | 711/4 |
| 5,940,862 | A * | 8/1999 | Erickson et al. | 711/154 |
| 6,014,086 | A * | 1/2000 | Miyashita | 340/7.6 |
| 6,247,135 | B1 | 6/2001 | Feague | |
| 6,487,560 | B1 | 11/2002 | LaRue | |
| 6,499,039 | B1 * | 12/2002 | Venkatesh et al. | 707/204 |
| 6,529,944 | B1 * | 3/2003 | LeCrone | 709/211 |
| 6,928,467 | B2 * | 8/2005 | Peng | 709/219 |
| 7,222,141 | B2 * | 5/2007 | Zondervan et al. | 707/204 |
| 7,290,019 | B2 * | 10/2007 | Bjorner et al. | 707/206 |
| 2002/0133508 | A1 | 9/2002 | LaRue | |
| 2002/0194207 | A1 | 12/2002 | Bartlett | |
| 2005/0015436 | A1 * | 1/2005 | Singh et al. | 709/203 |
| 2005/0027817 | A1 | 2/2005 | Novik | |
| 2005/0125430 | A1 * | 6/2005 | Souder et al. | 707/100 |
| 2006/0184589 | A1 * | 8/2006 | Lees et al. | 707/201 |

OTHER PUBLICATIONS

Byung-Yun Lee, et al., *Data Synchronization Protocol in Mobile Computing Environment Using SyncML*, 5th IEEE International Conference on High Speed Networks and Multimedia Communication, 2002, pp. 133-137.

(Continued)

*Primary Examiner*—Wilson Lee
*Assistant Examiner*—Kim T Nguyen
(74) *Attorney, Agent, or Firm*—Workman Nydegger

(57) ABSTRACT

Systems and methods for replicating replicas in a sync community. Each replica in the sync community stores knowledge that represents changes the replica is aware of. Because each replica has its own knowledge, each replica does not need to know how many replicas are in the sync community or the topology of the sync community. By sending the knowledge with a request for changes, a replicating replica can enumerate the changes to replicate by comparing its knowledge with the received knowledge. After replication, the knowledge is updated. Knowledge may also include made-with-knowledge change IDs that permit each resolution to identify what a replica was aware of when a particular change was made. The made-with-knowledge values are used to detect conflicts during replication.

36 Claims, 8 Drawing Sheets

OTHER PUBLICATIONS

M. Adaka, et al., *A Dynamic Synchronization Protocol and Scheduling Method. Based on Timestamp Ordering for Real-Time Transactions*, Institute of Electronics Information and Communication Engineering, Apr. 1999, vol. J82D-I, No. 4, pp. 560-570.

A. Fukii et al., *A Fast Sequential Distributed Synchronization Protocol*, Systems and Computers of Japan, Nov. 15, 1998, vol. 29, No. 12, pp. 11-18.

C. Mourlas, et al., *Task Synchronization for Distributed Real-Time Applications*, IEEE Computer Social, 1999, pp. 184-190.

J. Parrow et al., *Designing a Multiway Synchronization Protocol*, computer Communications, Dec. 1996, vol. 19, No. 14, pp. 1151-1160.

S. Chrobot et al., *Common Primitives for Synchornisation Protocols*, Kuwait Journal of Science & Engineering, 1996, pp. 97-111.

R. Rajkumar, *Real-Time Synchronization Protocols for Shared Memory Multiprocessors*, IEEE Computer Social Press, 1990, pp. 116-123.

S. Jajodia et al., *Transaction Processing in Multilevel-Secure Databases Using Replicated Architecture*, IEEE Computer Social Press, 1990, pp. 360-368.

E. Rahm, *A reliable and Efficient Synchronization Protocol for Database Sharing Systems*, Fault-Tolerant Computer Systems 3$^{rd}$ Interantional CI/ITG/GMA Conference Proceedings, 1987, pp. 336-347.

S. Miranda, *A Formal Specification Framework for Synchronization Protocols in Distributed Data Bases*, Distributed Data Sharing Systems Proceedings of the Second International Seminar, Netherlands, 1982, pp. 45-54.

Notice of Allowance mailed Jul. 25, 2007 in related case U.S. Appl. No. 10/631,212.

* cited by examiner

FIG. 7C

$$K = \begin{matrix} A5 & B1 & C5 & D10 \\ +A7 & +B2 & C6 \\ +A8 & +B3 & C7 \\ +A9 & +B4 & C8 \\ +A10 & +B6 \end{matrix}$$
— 710
— 712

$$K = A5 \quad B4 \quad C8 \quad D10$$
— 714
$$+(A7:A10)+B6$$
— 716

FIG. 7A

Exception List $$K_A = A5B3C1D10 \quad\quad K_B = A3B3C5D8$$
$$\begin{matrix} +C2 & & +A4 & +D9 \\ +C3 & & +A5 & +D10 \\ +C4 \\ +C5 \end{matrix}$$
$$= A5B3C5D10 \quad\quad = A5B3C5D10$$

Pointwise Maximum

A5B3C1D10 — 608
A3B3C5D8 — 616
$$K_A = K_B = A5B3C5D10$$ — 708

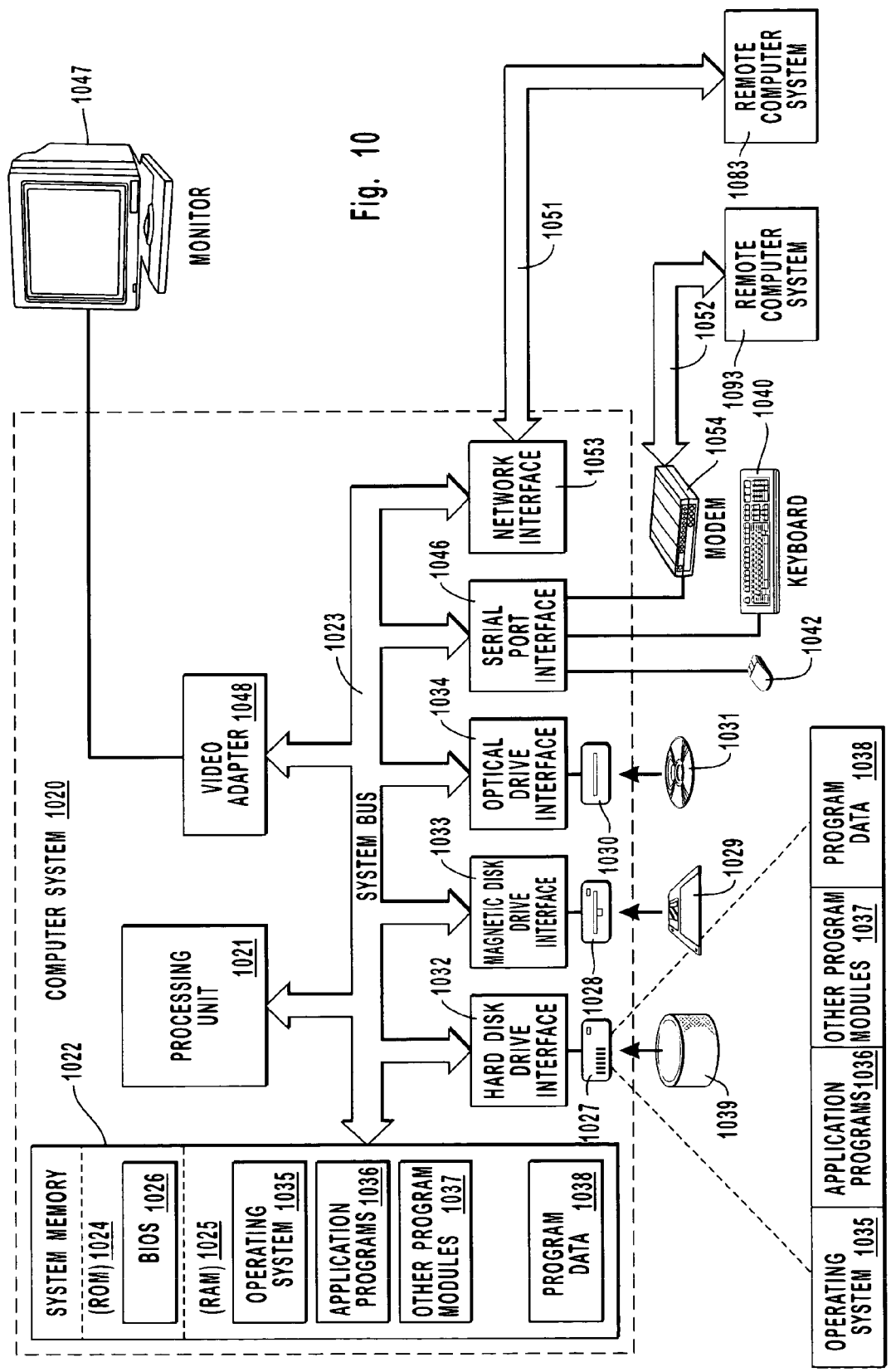

SYSTEMS AND METHODS FOR REPLICATING DATA STORES

BACKGROUND OF THE INVENTION

1. The Field of the Invention

The present invention generally relates to replicating data stores. More specifically, the invention relates to replicating data stores using knowledge of the changes that a particular data store is aware of to enumerate changes and detect conflicts.

2. Background and Relevant Art

In today's world of digital information handling, individuals may store information or data in a variety of different devices and locations. Often the user stores the same information in more than one device and/or location. Obviously, the user would like all of the various data stores to have the same information without having to manually input the same changes to each data store. Replication is one process used to ensure that each data store has the same information.

For example, a user may maintain an electronic address book in a myriad of different devices or locations. The user may maintain the address book, for example, on a personal information manager stored on their desktop computer, on their laptop computer, in a personal digital assistant (PDA), in an on-line contacts manager, and the like. The user can modify the electronic address books in each location by, for example, adding a contact, deleting a contact, or changing contact information. One goal of replication is to ensure that the change made on a particular device is ultimately reflected in the data stores of the user's other devices.

One common replication method involves keeping track of changes that have occurred subsequent to a previous replication. For example, a device that is seeking to be replicated with another device may submit a request for changes. Hopefully, the changes that will be sent are those that have occurred since the last replication. The replica sending updated information checks for any changes that are time stamped subsequent to a previous replication. Any changes with such a time stamp are sent to the device requesting replication. Currently, replication typically requires that each replica be aware of the other replicas or the topology in which it is operating. Each replica also maintains a record of what changes have been replicated on other replicas. In effect, each replica must maintain information about what it believes is stored on the other replicas within the topology.

This type of replication does not provide a user with adequate assurance that each replica is correctly replicated with other replicas in the topology. Problems with conflicting data may arise when changes are made to the same data stored in different replicas. For example, a user may make changes to a contact stored on their desktop computer and subsequently make different changes to the same contact stored on a PDA. Another problem may arise with respect to changes made to different portions of corresponding objects on different replicas. For example, a change may be made to the address of a contact on the desktop computer where a phone number change may be made to the same contact on the PDA. Replicating the entire contact would likely result in one of the changes being lost during replication.

The challenges of replication become more complicated when more than two replicas are included in the same sync community or topology. Among these challenges are problems involving replacing more current data with outdated data based on the order devices are replicated, sync loops in which data in the replica is continually updated and replaced with alternating versions of the data, incurring increased overhead by replicating data that may already be in sync and having data that is in sync being reported as being in conflict.

For example, consider a sync community that includes three replicas. Replica 1 is updated at time 1 by a user. At time 2, the same data is updated in replica 2. Replica 2 then replicates with replica 3. When replica 1 subsequently replicates with replica 3, the data updated on replica 2 may be replaced with the updated data from replica 1. As a result, data that is chronologically more current may be replaced by out of date data.

Communication resources may also be wasted when multiple replicas incorrectly believe that information is out of synch such that a synch operation is performed. For example, the three replica sync community. Replica 1 is updated by a user. Replica 1 then replicates with replica 2. The information in replica 2 is updated by the replication to reflect the changes to replica 1. Replica 2 then replicates with replica 3 such that the information from replica 2, which is currently on replica 1, is updated on replica 3. Replica 3 then replicates with replica 1. Replica 3 does not know what version of information is on replica 1, but only knows that replica 1 has been updated. Thus, replica 3 replicates its information with replica 1 where the information is the same information already on replica 1. Thus needless data communication resources are utilized in the unnecessary replication. Additionally, other needless replications may continue as replica I replicates with replica 2 or in other pair-wise replications at subsequent times.

In some cases, replicated data may actually appear as being in a conflict. For example, consider a three replica sync community. The information on replica 1 is updated and replicated with replica 2. The information on replica 1 is then replicated with replica 3. Replicas 2 and 3 then attempt a replication only to discover that they each have changes (the replication with replica 1) that have occurred since their last replication. Thus, data that is actually replicated appears to be in conflict.

In other words, replication between two or more other replicas is subject to various problems including unnecessary replications, wasted bandwidth, false conflict detection, inaccurate conflict resolution, and the like. These problems are magnified when the various replicas being replicated speak different protocols.

BRIEF SUMMARY OF THE INVENTION

Principles of the present invention can be used to implement a method of replicating replicas in a sync community. Replication occurs using the knowledge of each replica. The knowledge of a particular replica reflects the changes that the particular replica is aware of. Advantageously, each replica is relieved of the burden of remembering the changes that have occurred at other replicas. In addition, each replica is not required to know how many replicas are in a particular sync community and does not need to know the topology, i.e. which replicas replicate directly with which other replicas, of the sync community. Further, the replicas do not need to know the overall synch schedule, i.e. when replicas replicate with each other.

The knowledge stored by each replica includes a set of change IDs. Each change ID includes a (replica ID, change number) pair. The replica ID refers to one of the members in the sync community and the change number represents the changes on the replica that the current replica is aware of. The knowledge of a replica can be used, for example, to enumerate changes and to detect conflicts.

When a first replica replicates with a second replica of the sync community, the first replica sends its knowledge to the second replica. The second replica uses the knowledge to enumerate the changes that the first replica does not have. By having the first replica send its knowledge, the second replica does not need to maintain any information about what items already exist on the first replica or what replications have occurred between the first replica and the second replica. In this manner, the second replica uses the knowledge of the first replica to enumerate changes that are then sent to the first replica.

The knowledge can also be used to detect conflicts during replication. Generally, two changes in a sync community conflict if they were made by different replicas without knowledge of the other replica's change. In one embodiment, each replica stores a made-with-knowledge value associated with each change that may be sent to another replica during replication. The made-with-knowledge value identifies the changes that a particular replica was aware of when a particular change was made. In other words, the made-with-knowledge value reflects the base knowledge that a replica had when it performed a change. The made-with-knowledge values can be used to determine if a change is in conflict by comparing the made-with-knowledge value with a change ID. The made-with-knowledge value enables a replica to determine if a particular change was made with the knowledge of the change that appears to be in conflict. If a change was made with knowledge of the other change, then there is no conflict.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims.

BRIEF DESCRIPTION OF THE DRAWINGS

In order to describe the manner in which the above-recited and other features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 7A illustrates one embodiment of updating knowledge in a replica subsequent to a replication using an exception list;

FIG. 7B illustrates one embodiment of updating knowledge in a replica subsequent to a replication using a pairwise maximum of knowledge vectors;

FIG. 7C illustrates one embodiment of updating knowledge in a replica subsequent to a replication where exceptions exist in the updated knowledge;

FIG. 10 illustrates an exemplary computer system that is a suitable operating environment for embodiments of the present invention.

DETAILED DESCRIPTION OF THE PREFERRED EMBODIMENTS

The present invention extends to both systems and methods for replicating data on data stores within a sync community. Replication typically occurs among a group of participating replicas that form a sync community. Advantageously, the total membership of the sync community does not necessarily need to be known to any given replica at any given time. The topology of the sync community is also not necessarily known to any given replica at any given time. Each replica in the sync community has an ID, which is a global unique identifier (GUID) in one embodiment.

Each replica maintains "knowledge" that facilitates efficient and improved replication. In one embodiment, knowledge is metadata that expresses the changes that are known to a given replica. Knowledge may be represented as a vector of pairs or change IDs where each pair or change ID represents a replica ID and a maximum version (replica ID, max version). The number of pairs in a particular knowledge vector may change as replicas are added to or removed from the sync community. While the knowledge vector may also be expressed differently, it is advantageous to concisely represent the changes of which a particular replica is aware. There is no requirement that the particular knowledge specifically contain a change ID for each replica in the a sync community. Replicas are relieved from tracking what other replicas already know, as this information is effectively represented by the knowledge of the replica.

The replicas in sync community replicate by providing their own knowledge with the replica with which they replicate. To reduce the amount of data representing knowledge that must be sent between replicating replicas, the knowledge may be expressed as a knowledge vector as previously described. Thus, the knowledge that is sent between the replicas does not need to include every change ID, but may be in the form of a vector that represents a number of change IDs. For example, if a replica is aware of all changes made by a replica A from a first change to a tenth change, and all changes made by a replica labeled B from a first change to a fifth change, the replica might send a knowledge vector A10B5 indicating that the replica is aware of all changes corresponding to change IDs A1 to A10 and all changes corresponding to change IDs B1 to B5. While the knowledge may be expressed as a knowledge vector, other embodiments of the invention contemplate other expressions of knowledge as well. For example, some embodiments of the invention express knowledge using any expression of knowledge in which one can (1) add a change to the expression of knowledge, (2) check whether a change is included in the expression of knowledge, and (3) merge two expressions of knowledge together.

Figure 1:
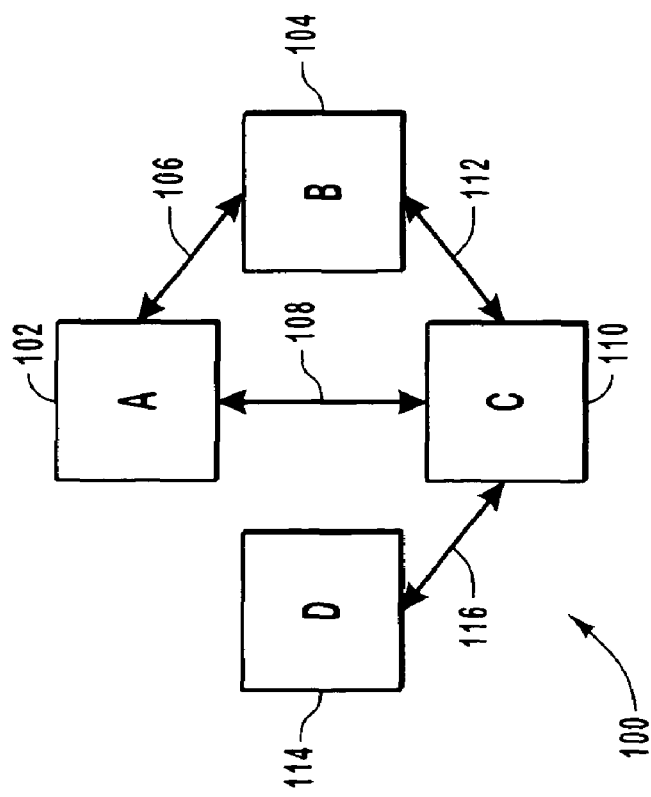
FIG. 1 illustrates an example of a sync community for implementing embodiments of the present invention.

FIG. 1 illustrates one example of a sync community 100 with the illustrated topology. The sync community 100 includes a number of replicas and is one example of an environment for implementing embodiments of the present invention. The replicas in the sync community 100 represent various data stores or devices that may include, but are not limited to, computers, notebook computers, personal digital assistants, cellular telephones, other wireless devices, server computers, online services, and the like or any combination thereof.

In FIG. 1, a replica A 102 may be electronically coupled to a replica B 104 through a communication link 106. The replica A 102 may be connected through a communication link 108 to a replica C 110. Replica C 110 may be connected to replica B 104 through a communication link 112. Replica C 110 may further be connected to a replica D 114 through a communication link 116. In this sync community 100, although not all of the replicas are directly connected through communication links, changes in any of the replicas can be replicated to any of the other replicas within the sync community 100.

For example, for the replica A 102 to be replicated with the replica D 114, replicas A 102 and C 110 may be replicated through the communication link 108. Thus, replica C 110 includes changes made on replica A 102. Replicas C and D then replicate through the communication link 116, and as such replica D 114 includes changes from replica A 102. In this way, replica A 102 can replicate with replica D 114 without any sort of direct link. In fact, replicas A 102 and D 114 may not even be aware of each other's existence within the sync community 100. The illustrated communication links can be wired and/or wireless links.

Figure 2:
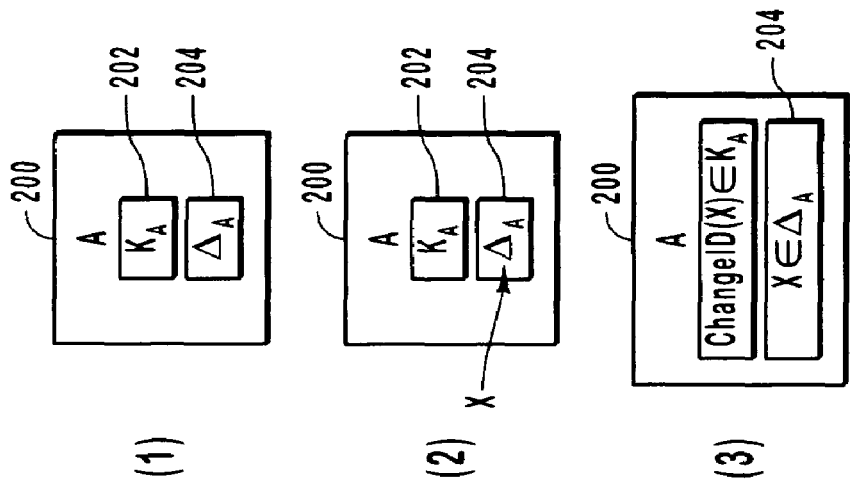
FIG. 2 illustrates a replica and a timewise illustration showing a change being added to the replica and the knowledge of the replica being updated to include the change.

Referring now to FIG. 2, one embodiment of the invention illustrates how changes are managed in a replica. FIG. 2 shows a time wise progression of a replica A 200. Replica A 200 includes knowledge 202, in this case labeled $K_A$, and changes 204 in this case labeled $\Delta_A$. Each change in the changes 204 is the current data content of an item. A change may be a new item added to a replica even though no item was changed per se, the deletion of an item, and the like. Each of the changes 204 is associated with a version that in one embodiment of the invention is a change ID. Notably, one advantageous aspect of the invention is that there is no need to maintain a change log including information about previous changes. Rather, each replica includes knowledge and a database of changes (i.e. current items) where each change has a corresponding version. At time (1), replica A 200 is in a steady state. At time (2), a user inputs a change labeled X into replica A 200. FIG. 2 shows the change X being added as a member of the changes 204. The knowledge 202 is updated to include a change ID, ChangeID(X), that is associated with the change X and identifies the addition of the change X to the changes 204. This embodiment illustrates one way in which changes to the replica are associated with specific change IDs. The knowledge 202 may be a knowledge vector and represents the changes that the replica A 200 is aware of. In one embodiment of the present invention, versions or change IDs are maintained for items or objects in a database and the versions can be used to identify what needs to be replicated. Alternatively, a log of changes may also be maintained.

Figure 3:
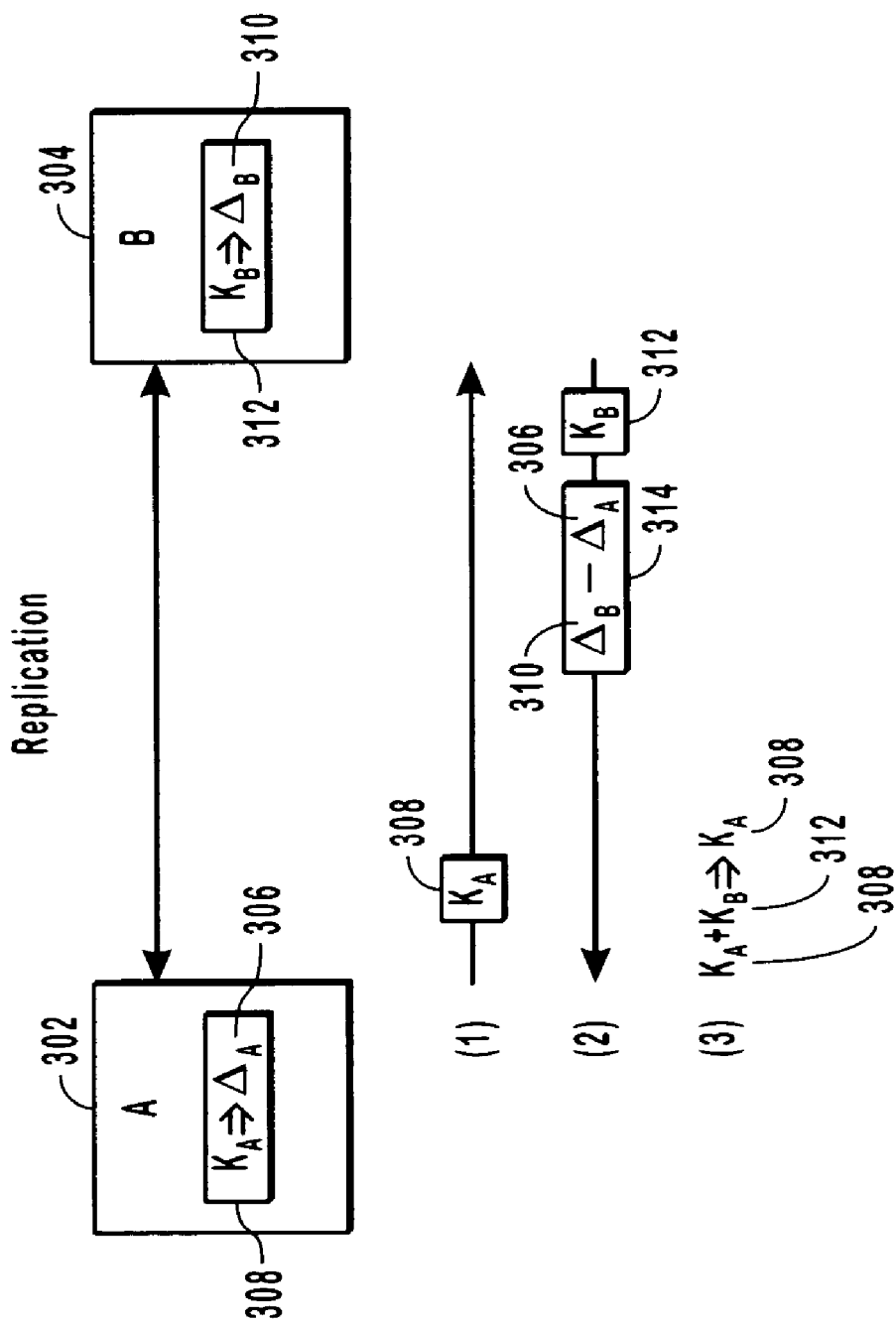
FIG. 3 illustrates one embodiment of a timewise replication scenario between two replicas.

FIG. 3 illustrates the use of knowledge to enumerate changes during replication. FIG. 3 shows two replicas, namely replica A 302 and a replica B 304. Replica A 302 includes a set of changes 306 in this example labeled $\Delta_A$. Replica A 302 further includes knowledge 308, in this example labeled $K_A$. The knowledge 308 includes a list of change IDs such as those described above. Similarly, replica B 304 includes a set of changes 310 each associated with a version that is a change ID To begin the replication, at time (1) replica A 302 sends a synch request to replica B 304 that includes the knowledge 308. Replica B 304, by comparing the knowledge 308 to the versions associated with each of the changes in the set of changes 310, can make decisions regarding which of replica B's changes 310 replica A 302 already has in its changes 306 and changes about which replica A is aware of. Alternatively, the replica B 304 compares the knowledge 308 to the each item's version. Thus, replica B 304 sends to replica A 302 at time (2) only that portion of Replica B's changes 310 that are associated with versions that are not included in the knowledge 308 of replica A 302 as illustrated by changes 314. For example, if the knowledge vector of replica A was A3B12 and replica B has current changes associated with versions that are change IDs B13 and B14, then the changes sent to the replica A would include those associated with the change IDs B13 and B14. In one embodiment, only B14 is sent if B13 and B14 were made to the same item.

In addition, replica B 304 also sends replica B's knowledge 312 to replica A 302. Because replica B 304 has sent all of the changes 310 available in replica B 304 not already in Replica A 302 to replica A 302, replica A 302 now has all of the changes 306 that were originally in replica A 302, insofar as those changes 310 have not been superceded by the changes sent by replica B 304, in addition to the changes 310 that were originally in replica B 304. Replica A 302 further has information about all of the changes that replica B 304 was aware of. Therefore, replica A 302 can update its knowledge 308 to reflect the addition of the changes 310. This is done simply by adding replica A's knowledge 308 to replica B's knowledge 312 and defining that value as replica A's knowledge 308 such as is shown at time (3) in FIG. 3.

As such, an efficient replication is performed wherein only the needed changes are replicated and wherein the individual replicas replicating only need to maintain information regarding the changes that reside within the particular replica and previous changes about which it is aware of. While this example shows a complete replication of all of the changes on replica B to replica A, cases exist where only portions of the changes are replicated. As such, only change IDs that correspond to changes that are replicated are added to the knowledge of the replica receiving updates.

Figure 4:
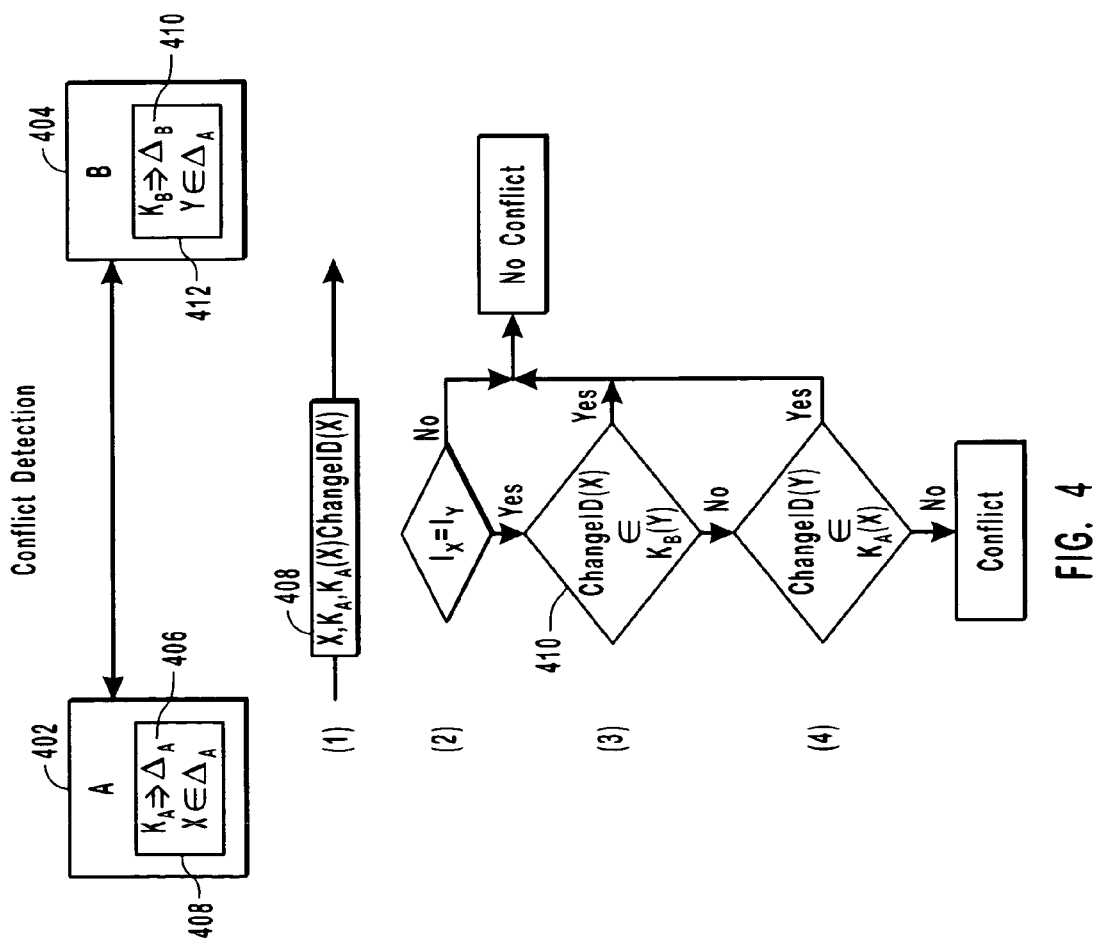
FIG. 4 illustrates one embodiment of a timewise conflict detection scenario.

In addition to enumerating changes, knowledge of a replica can also be used in conflict detection. Referring now to FIG. 4, one embodiment of the present invention illustrates how conflict detection can be accomplished. FIG. 4 shows two replicas connected by an electronic link (wireless and/or wired) for communication and replication. Replica A 402 includes knowledge 408 and a set of changes 406. As with the example in FIG. 3, the knowledge 408 includes a collection of change IDs associated with the changes 406 and associated with previous changes. Replica A 402 further includes, for purposes of this example, a change to an item made in replica A 402. The change is labeled X and X is a member of the changes 406. Similarly, replica B 404 includes knowledge 412, a collection of changes 410 and a change to an item labeled Y that is a member of the changes 410. Illustratively, at time (1) replica A 402 sends change X to replica B 404.

Associated and sent with change X are two other values, namely the change ID associated with change X, labeled ChangeID(X), and a made-with-knowledge value, labeled $K_A(X)$. The made-with-knowledge value is the knowledge that existed in replica A 402 at the time change X was made to replica A 402. Alternatively, in some embodiments of the invention the made-with-knowledge may be the knowledge that existed in a replica when a change is sent. Replica A's current knowledge 408 may also be sent to replica B 404. As shown in time (2), replica B 404 compares the item changed by change X with the item changed by change Y. If change X and change Y correspond to different items, then there is no conflict.

If the changes refer to different versions of the same item, then further analysis is required. Replica B 404 then checks to see if change X was known to replica B 404 when change Y was made in replica B 404. Change Y has a change ID, ChangeID(Y) and a made-with-knowledge value, $K_B(Y)$, associated with it. If ChangeID(X) is a member of change Y's made-with-knowledge, $K_B(Y)$, then there is no conflict. In other words, change Y was made in replica B 404 with knowledge of the change X made in Replica A 402. As such, the change Y now represents the most current and valid data for the replicas A and B. Although not shown in the example illustrated by FIG. 4, at a subsequent time, change Y will likely be sent to replica A 402 and the item associated with changes X and Y updated to change Y on the replica A 402 in a fashion described in FIG. 3.

If the changes X and Y are for the same item, and ChangeID(X) does not appear in $K_B(Y)$, then as shown at time (4), a check is done to see if change Y was known by replica A 402 when change X was made. This is typically done by checking to see if the change enumeration for change Y, illustrated as ChangeID(Y), is included in replica A's knowledge 408 at the time change X was made, $K_A(X)$. If ChangeID(Y) is a member of $K_A(X)$, then change X was made-with-knowledge of change Y and there is no conflict. Change X is the most current and valid change for the particular item. As such, replica B 404 will likely be updated with change X in a fashion as described in FIG. 3.

If the changes X and Y are for the same item, the ChangeID(Y) does not appear in $K_A(X)$ and ChangeID(X) does not appear in $K_B(Y)$, then a true conflict exists. In other words, change X and change Y were made independent of each other. In this case, a conflict will be reported and various conflict resolution rules may be applied to determine which change, X or Y, is the most current and valid change. Such rules may include checking time stamps to determine which change was made most recently, always resolving conflicts in favor of certain type of replicas (such as those stored on servers) and/or any other suitable conflict resolution. Alternatively, in one form of conflict resolution, an item with conflicting changes may be updated such that conflicting changes are merged to form a new change.

Figure 5:
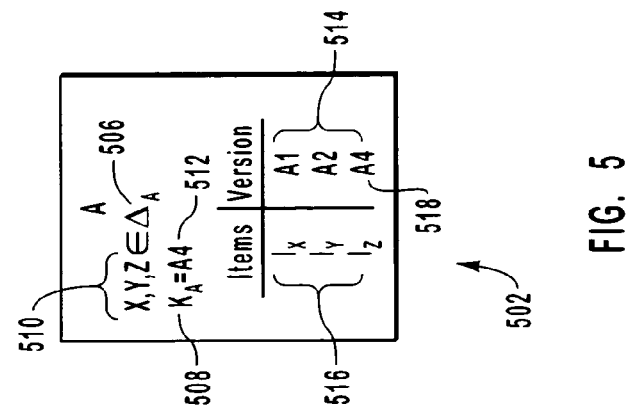
FIG. 5 illustrates an example of assigning change IDs to changes in a replica.

Referring now to FIG. 5, one exemplary embodiment of Change IDs and knowledge tracking is shown. FIG. 5 shows a replica 502. The replica 502 includes a collection of changes 506 and knowledge 508. The collection of changes 506 includes several individual changes 510 in this example illustrated as X, Y and Z. In the example shown in FIG. 5, the present state of the knowledge of the replica is denoted by a knowledge vector 512 that in this case is A4. The knowledge vector 512 represents all of replica A's knowledge 508.

Also represented in FIG. 5 is a number of change IDs 514. In the example of FIG. 5, replica A 502 includes three changed items 516, $I_X$, $I_Y$, and $I_Z$, corresponding to the changes 510. Using the change IDs, one can discern that the item $I_X$, with change ID A1, was made in replica A 502 at a first time. Change $I_Y$, with change ID A2, was made in replica A 502 at a time subsequent to the item $I_X$. And the item $I_Z$, with change ID A4, was made in replica A 502 at a time subsequent to when the item $I_Y$ was made. A3, though not illustrated directly in FIG. 5, may correspond to a previous change such as in one example, a change that is superceded by the change to item $I_Z$ labeled A4.

There is a difference between the change ID A4 and replica A's knowledge vector 512 that is also labeled A4. In this example, the knowledge vector A4 signifies that replica A's knowledge 508 includes the changes corresponding to the change IDs labeled A4, A3, A2 and A1. Said differently, a knowledge vector includes the change represented by the change ID 518 that is equal to the knowledge vector as well as all changes with the same replica ID that were made previous to the change ID 518 represented in the knowledge vector. On the other hand, in the present example the change ID 518 labeled A4 only represents the change Z made to item $I_Z$.

Figure 6:
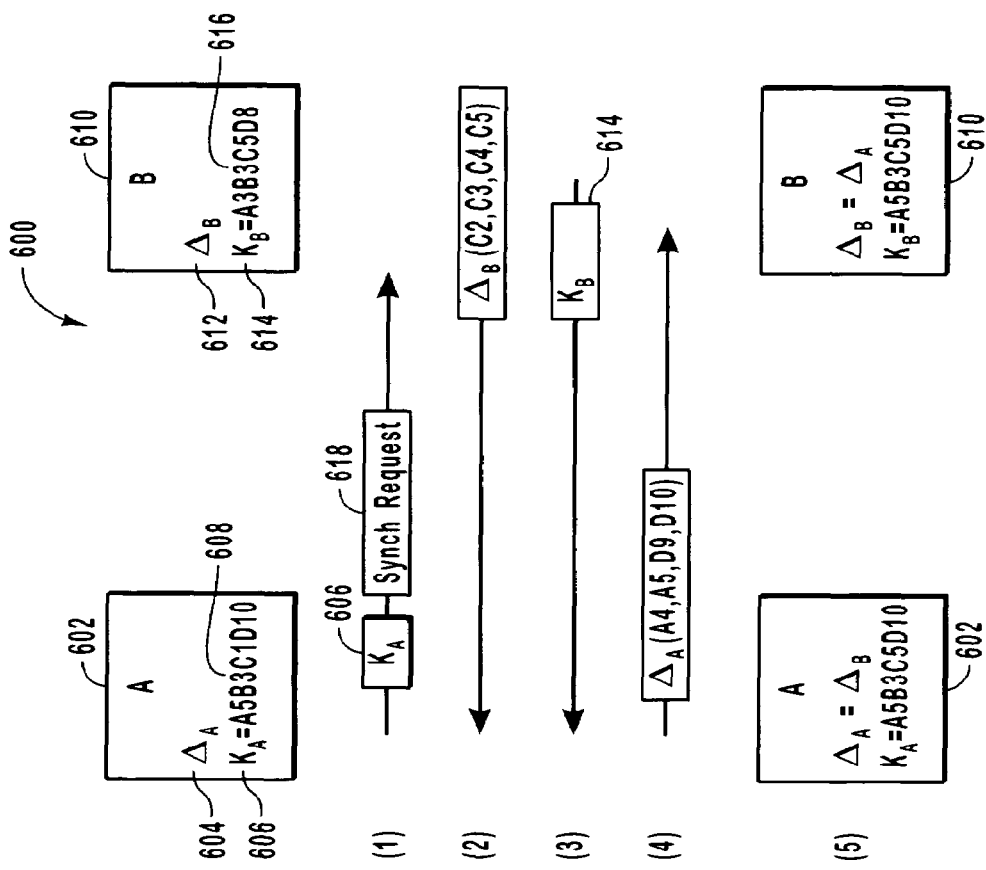
FIG. 6 illustrates one embodiment of a timewise replication scenario using knowledge vectors.

Referring now to FIG. 6, an example of two replicas replicating in a topology containing a number of replicas is shown. Replica A 602 contains a set of changes 604, knowledge 606 and a knowledge vector 608 that is a short hand representation of the knowledge 606. Illustratively, the knowledge vector 608 of replica A 602, A5B3C1D10, shows that replica A's knowledge 606 includes changes made up to a fifth change in replica A 602, knowledge up to a third change in a replica B 610, knowledge up to a first change in a replica C and knowledge up to a tenth change in a replica D. Replica B 610, in the example of FIG. 6, includes a set of changes 612, knowledge 614 and a knowledge vector 616 that is a shorthand representation of replica B's knowledge 614. Replica B's knowledge vector 616, A3B3C5D8, illustrates that replica B has knowledge including knowledge up to a third change made by replica A 602, knowledge up to a third change made by replica B 610, knowledge up to a fifth change made by replica C and knowledge up to an eighth change made by replica D. The knowledge vectors set forth above include a continuous representation of change enumerations made by a replica from a first change to some subsequent change. As will be explained in more detail later herein, a knowledge vector may also include a beginning point that is some other change enumeration than the first change enumeration made by a replica.

A time wise illustration of the replication of replica A 602 with replica B 610 is illustrated in FIG. 6. At time (1), replica A 602 sends a synch request 618 along with replica A's knowledge 606, that may be represented by replica A's knowledge vector 608, to replica B 610. Replica B 610 at time (2) examines replica A's knowledge 606 by comparing it to change IDs associated with the changes in Replica B. Replica B 610 discovers that replica A is not aware of changes made by replica C that are labeled with the change IDs C2, C3, C4 and C5. Thus, replica B sends replica B's changes 612 corresponding to these change IDs so long as the changes labeled with those change IDs are the current changes applicable to items in Replica B 610. If a change ID corresponds to a previous outdated change, no change corresponding to that ID is sent. For example, if an item that had a version C3 was updated and assigned a new version, the change associated with C3 no longer exists in replica B 610 and is not sent to replica A. Subsequently or simultaneously as illustrated in time (3) replica B 610 sends to replica A 602 replica B's knowledge 614 that may be represented as a knowledge vector 616.

At time (4) replica A 602 examines the knowledge 614 sent by replica B by comparing it to the change ID's corresponding to changes in replica A 602. Replica A 602 discovers that replica B does not have either the changes represented by the change IDs A4, A5, D9 and D10, or knowledge about those changes. Thus, replica A 602 sends any current changes existing in replica A's changes 604 corresponding to those change IDs (except when the change ID represents an outdated change such that no change is sent). Replica A 602 may subsequently send a message to replica B 610 indicating that all changes have been sent such that replica A 602 and replica B 610 can now update their knowledge vectors 608 and 616 respectively to include the recently replicated changes. As shown in FIG. 6 at time (5), replica A's knowledge vector, A5B3C5D10, is equal to replica B's knowledge vector which includes all changes made by replica A up to a fifth change enumeration, all changes made by replica B up to a third change enumeration, all changes made by replica C up to a fifth change enumeration and all changes made by replica D up to a tenth change enumeration.

Referring now FIGS. 7A and 7B, two methods of updating the knowledge vectors following a complete replication such as that represented in FIG. 6 are shown. Specifically, FIG. 7A illustrates a method for updating the knowledge vectors using an exception list 702 stored on a replica. To create an exception list 702, as changes are sent between replicas, the changes are sent with a change ID associated with the change. When the change is added to a replica, the change ID is added as an exception to an exception list 702. Examining now the knowledge for replica A in FIG. 7A; the knowledge includes a knowledge vector 608 and an exception list 702 which includes the exceptions C2, C3, C4 and C5. An examination of the exception list 702 in conjunction with the knowledge vector 608 reveals that including the change IDs from the exception list 702, the knowledge of Replica A includes all changes up to a fifth change made by replica C. Thus, the exceptions can be removed from the knowledge of Replica A 602 and the knowledge vector updated to include an element C5 as shown in the updated knowledge vector 704. A similar analysis can be performed on the knowledge 614 of replica B 610. The original knowledge vector 616 combined with the exceptions A4, A5, D9 and D10 in the exception list 703 allows the knowledge vector 616 to be updated to an updated knowledge vector 706.

Notably, if only a partial replication was performed, such as for example if the changes corresponding to the change IDs A4 and D9 were not sent in a replication such as that represented by FIG. 6, then the knowledge 614 of replica B 610 would need to maintain the exceptions A5 and D10 until a subsequent replication with another replica that transfers the changes represented by the change IDs A4 and D9 to replica B 610.

FIG. 7B illustrates another method of updating the knowledge vectors 608 and 616 to reflect the replication shown in FIG. 6. In this example, the knowledge vectors are updated using an element-wise maximum for each of the elements in the original knowledge vectors 608 and 616 to form an updated knowledge vector 708. The first element of each of the knowledge vectors 608 and 616 corresponds to a set of change IDs labeling changes made in replica A. Because A5 is the element-wise maximum element of the two knowledge vectors 608 and 616, the updated knowledge vector 708 includes an element A5. Likewise, the vector elements B3, C5 and D10 each represent an element-wise maximum element corresponding to the changes on the particular replicas to which each of the elements correspond. Examination of each of the updated knowledge vectors 704, 706 and 708 reveals that by either method, the same updated knowledge vector is obtained. The element-wise maximum method of knowledge vector updating is typically used when a complete replication has been performed whereas as an exception list method of updating the knowledge vector may be useful when it is not certain that a complete replication has occurred (a user may cancel the replication, a device may crash, etc.). Namely, the exception list method may need to be used such that exceptions can continue to comprise a portion of the knowledge of a particular replica when the fall knowledge of the replica cannot be represented in simple vector form.

Referring now to FIG. 7C, an example of updating knowledge is shown for a replica that has information from an incomplete replication. FIG. 7C includes an original knowledge vector 710, an original exception list 712, an updated knowledge vector 714, and an updated exception list 716. With regard to the replica shown, after the partial replication, the replica has all of the change IDs labeled A1 through A5, represented by the vector element A5, and all of the change IDs labeled A7 through A10 represented by the list of exceptions including A7, A8, A9 and A10. As shown in FIG. 7C, in an updated version of the knowledge, the updated exception list 716 can be shortened to indicate inclusion of all elements from A7 to A10 such as by the expression (A7:A10) shown in FIG. 7C. This expression is simply a vector such as those that have been previously discussed herein except that the beginning point of the vector is some other point than the first change enumeration for replica A. Thus the representation of the replica's knowledge as it relates to A is represented by the vector element A5 and the exception vector (A7:A10).

In the case of the knowledge of the replica regarding replica B, the knowledge vector 710 can be updated to include the continuous change IDs subsequent to the change IDs included in the vector element for replica B. The vector element B1 includes only the change ID B1. Because change IDs B2, B3 and B4 exist in the exception list 712, and they are continuous with the change ID B1 included in the knowledge vector 710, the vector element for replica B can be updated to B4 in the updated knowledge vector 714 which represents the inclusion of elements B1 through B4. Because the change ID B5 is missing from the exception list, the exception B6 must remain in the exception list 716 in the updated knowledge.

A similar analysis can be performed regarding the replica of FIG. 7C's knowledge regarding changes made by replica C. The original knowledge vector 710 includes C5. The original exception list includes C6, C7 and C8. Because the original knowledge vector element C5 includes change IDs C1 through C5, and C5 is continuous with the change IDs in the original exception list 712, the updated knowledge vector element for replica C can be updated to C8.

Figure 8:
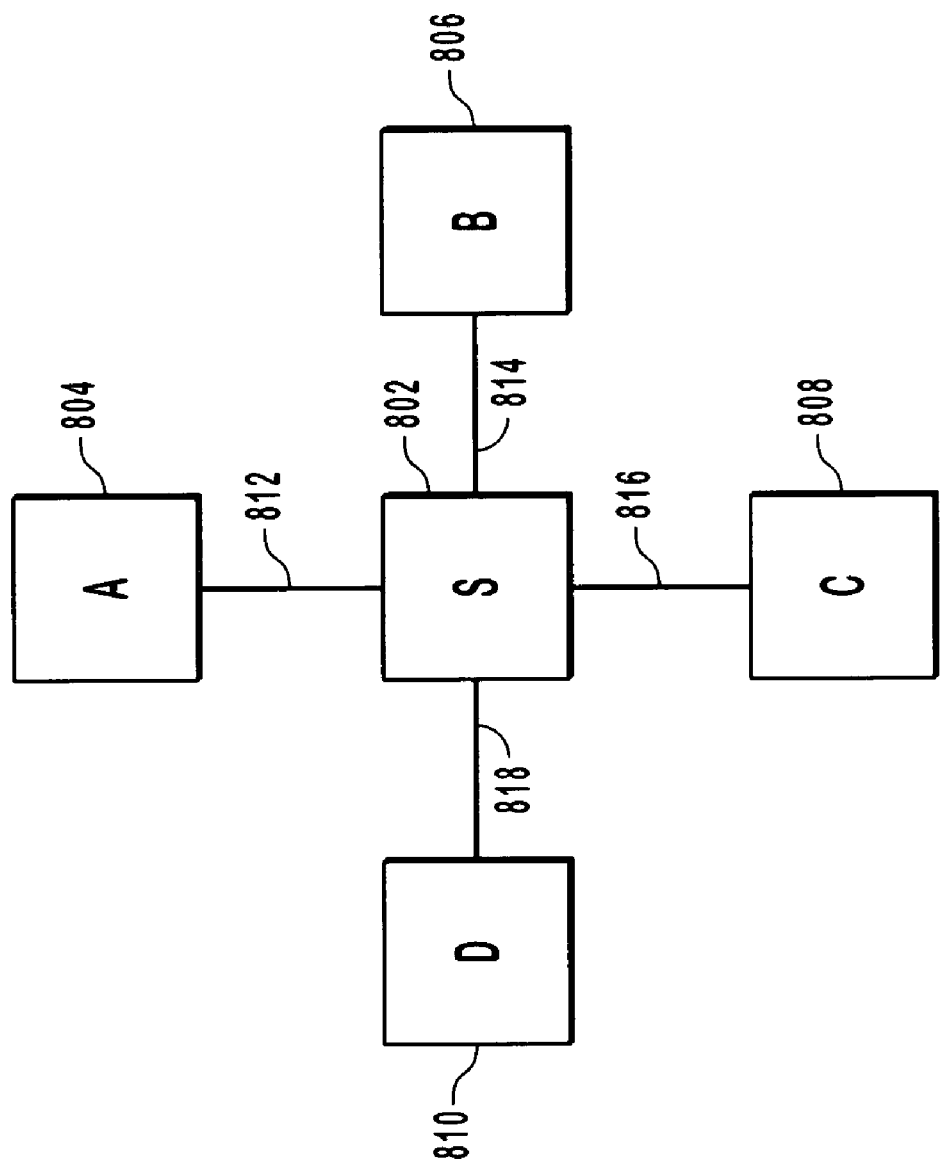
FIG. 8 illustrates a hub-and-spoke topology for implementing replication including surrogate replication.

One challenge that may arise with respect to the size of knowledge vectors is especially prevalent when the number of replicas in a sync community is great. In a topology where the knowledge vector includes a change ID or other vector element for each and every replica within the sync community, the knowledge vector increases with each replica that is added to the sync community. One optimization is to recognize that in some sync communities not every replica needs to be represented in the knowledge vector. One illustration of such a case is the sync community shown in FIG. 8 which represents a hub and spoke server topology. FIG. 8 shows a server 802 connected to a number of clients including replica A 804 replica B 806 replica C 808 and replica D 810. In this example, all replication paths 812-818 between the clients are through the server 802 and thus the server 802 can assign a change ID that includes the server 802 as the replica ID. All changes made within the individual clients 804 through 810 remain within the respective client in which the change was made without the assignment of a change ID until a replication is performed. Thus, in this example, the knowledge vector includes a single element that comprises the replica ID and change ID of the server 802. Illustratively, if a change is made in replica A 804 and replicated with the server 802 at a first time, the server 802 assigns a change enumeration of S1 to the change. At a subsequent time, a change made in replica B 806 is replicated with the server 802. This change is assigned a change enumeration by the server of S2. Notably, while in this example, the server 802 assigns all change enumerations, other embodiments may exist where the server 802 assigns some change enumerations and other replicas assign other change enumerations.

Embodiments of the invention are adaptable to optimize the knowledge vector in other topologies as well. For example, in FIG. 1, replica D 114 only replicates with replica C 110. Thus, changes made by C and D can be enumerated using change enumerations that have a single replica ID. In one example, if the replica ID of replica C is chosen to be part of the change enumeration for all changes by either replica C 110 or replica D 114, a first change in replica C would be labeled with the change enumeration C1. A subsequent change in replica D 114 is labeled C2, and so forth. When one replica creates a change ID for changes made on a different replica, the replica creating the change ID may be referred to as a surrogate author.

By optimizing the knowledge vector for the particular topology or sync community, resources used for storing the knowledge vector can be conserved in topologies that approach hub and spoke server-client topologies such as that shown in FIG. 8. In topologies more like peer-to-peer networks, a larger knowledge vector is required, but the individual replicas can effectively and independently replicate with a larger number of other replicas while avoiding problems such as synch loops, false conflicts, and the like.

When different replicas are allowed to make changes to items independent of one another, conflicts between the independently made changes may result that should be resolved. Conflict resolution typically requires that there be certain rules for determining which item version should be chosen as the valid item. Examples of some of these rules include selecting the item change that was made last or selecting item changes that are made by particular types of replicas such as preferring changes made by servers over changes made by other types of replicas. Alternatively, all conflicts could be logged for manual resolution. Manual resolution is accomplished by a user providing a new value for the item in conflict that will replace the conflicting changes.

If all replicas within a sync community or topology resolve conflicts in the same way, no other resolution rules or resolution systems are typically required as all replicas within the system will migrate to a replicated resolution of any conflicts. While the replicas within the sync community may not be specifically designed to resolve conflicts in exactly the same way, the replicas within a sync community may nonetheless resolve conflicts in exactly the same way. Such an example of this is shown in FIG. 9A. FIG. 9A shows a replica D 902. Replica D 902 receives a change ID corresponding to a change in an item $I_x$ wherein the change ID is A4. Subsequently replica D 902 receives a change ID for the same item $I_x$ wherein the change ID is B5. Replica D 902 has conflict resolution rules to choose which of the changes to item $I_x$ is the preferred change. In this case replica D chooses the change to item $I_x$ labeled by the change ID A4. To indicate that a conflict was resolved by replica D 902 and how the conflict was resolved, a new change ID is assigned to the item $I_x$ that includes both the results of the conflict resolution and a new change ID assigned by the particular replica that made the conflict resolution. The new change ID includes the next sequential change enumeration for the replica that made the conflict resolution. In this case, the new change ID is labeled A4 (D7) to indicate that the change labeled A4 was chosen in the conflict resolution and that the conflict was resolved by replica D 902. As shown in FIG. 9A, a similar process occurs when a conflict in changes is detected by a replica C 904. Replica C 904 resolves the conflict in the same manner as replica D 902. Thus a new change ID labeled A4 (C3) is assigned to the change of the item $I_x$. In this case, the conflict between the changes to item $I_x$ labeled with the change IDs A4 and B5 will eventually be resolved in the same way in all of the replicas within the topology.

Figure 9B:
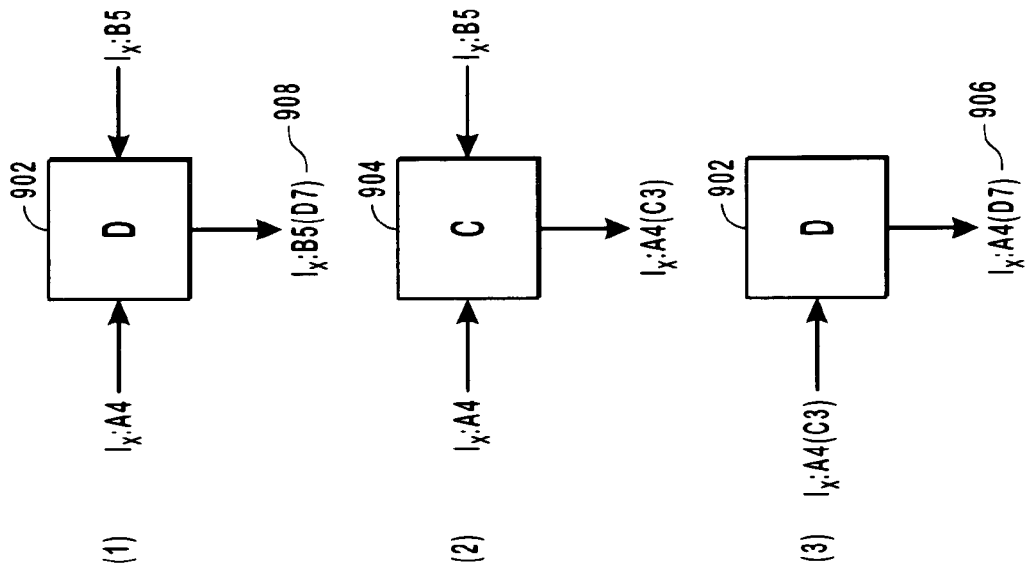
FIG. 9B illustrates other conflict resolution scenarios.
Figure 9A:
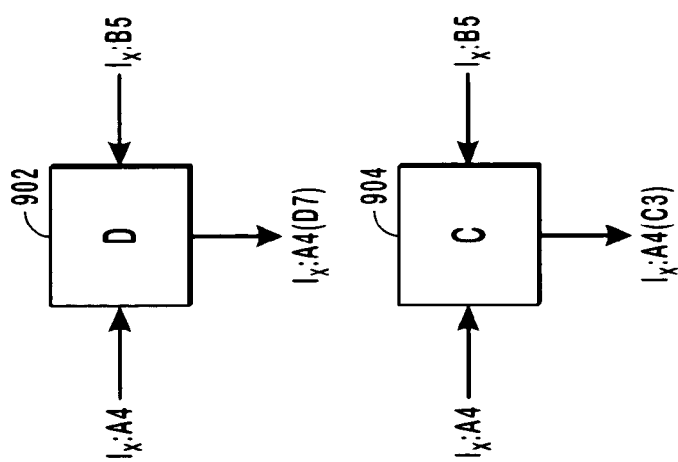
FIG. 9A illustrates examples of conflict resolution scenarios.

FIG. 9B illustrates an example where conflicts are resolved differently by different replicas within a topology. In FIG. 9B, at time (1) replica D 902 resolves the conflict in one way and assigns a new change ID to the items that illustrate the resolution of the conflict, B5, and the replica that that made the change, (D7). At time (2) replica C 904 resolves the same conflict in a different way shown by the new change ID assigned by replica C 904, A4 (C3). At time (3), replica D 902 receives replica C's resolution of the conflict. Replica D 902 at this point recognizes that this particular conflict has been resolved in two different ways. Some embodiments of the present invention therefore specify that a deterministic resolution be made between the conflicting changes to the item $I_x$. The particular deterministic resolution illustrated by FIG. 9B causes the change with the lowest value replica ID to be selected as the deterministic result. Thus, because A is a lower value replica ID than replica B the deterministic resolution of the conflict is selected to be the change labeled by the change ID A4. Replica D 902 thus changes the change ID associated with the change to item I to be A4 (D7). Note that to avoid replication loops or other conflict problems the change enumeration (i.e. D7) associated with the replica making the change is the same in the deterministic result 906 as in the original resolution of the conflict 908.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 10 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 10, an exemplary system for implementing the invention includes a general purpose computing device in the form of a computer 1020, including a processing unit 1021, a system memory 1022, and a system bus 1023 that couples various system components including the system memory 1022 to the processing unit 1021. The system bus 1023 may be any of several types of bus structures including a memory bus or memory controller, a peripheral bus, and a local bus using any of a variety of bus architectures. The system memory includes read only memory (ROM) 1024 and random access memory (RAM) 1025. A basic input/output system (BIOS) 1026, containing the basic routines that help transfer information between elements within the computer 1020, such as during start-up, may be stored in ROM 1024.

The computer 1020 may also include a magnetic hard disk drive 1027 for reading from and writing to a magnetic hard disk 1039, a magnetic disk drive 1028 for reading from or writing to a removable magnetic disk 1029, and an optical disk drive 1030 for reading from or writing to removable optical disk 1031 such as a CD-ROM or other optical media. The magnetic hard disk drive 1027, magnetic disk drive 1028, and optical disk drive 1030 are connected to the system bus 1023 by a hard disk drive interface 1032, a magnetic disk drive-interface 1033, and an optical drive interface 1034, respectively. The drives and their associated computer-readable media provide nonvolatile storage of computer-executable instructions, data structures, program modules and other data for the computer 1020. Although the exemplary environment described herein employs a magnetic hard disk 1039, a removable magnetic disk 1029 and a removable optical disk 1031, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 1039, magnetic disk 1029, optical disk 1031, ROM 1024 or RAM 1025, including an operating system 1035, one or more application programs 1036, other program modules 1037, and program data 1038. A user may enter commands and information into the computer 1020 through keyboard 1040, pointing device 1042, or other input devices (not shown), such as a microphone, joy stick, game pad, satellite dish, scanner, or the like. These and other input devices are often connected to the processing unit 1021 through a serial port interface 1046 coupled to system bus 1023. Alternatively, the input devices may be connected by other interfaces, such as a parallel port, a game port or a universal serial bus (USB). A monitor 1047 or another display device is also connected to system bus 1023 via an interface, such as video adapter 1048. In addition to the monitor, personal computers typically include other peripheral output devices (not shown), such as speakers and printers.

The computer 1020 may operate in a networked environment using logical connections to one or more remote computers, such as remote computers 1093 and 1083. Remote computers 1093 and 1083 may each be another personal computer, a server, a router, a network PC, a peer device or other common network node, and typically include many or all of the elements described above relative to the computer 1020. The logical connections depicted in FIG. 10 include a local area network (LAN) 1051 and a wide area network (WAN) 1052 that are presented here by way of example and not limitation. Such networking environments are commonplace in office-wide or enterprise-wide computer networks, intranets and the Internet.

When used in a LAN networking environment, the computer 1020 is connected to the local network 1051 through a network interface or adapter 1053. When used in a WAN networking environment, the computer 1020 may include a modem 1054, a wireless link, or other means for establishing communications over the wide area network 1052, such as the Internet. The modem 1054, which may be internal or external, is connected to the system bus 1023 via the serial port interface 1046. In a networked environment, program modules depicted relative to the computer 1020, or portions thereof, may be stored in the remote memory storage device. It will be appreciated that the network connections shown are exemplary and other means of establishing communications over wide area network 1052 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a sync community that includes a plurality of replicas, wherein each replica is able to make changes to data independently of other replicas in the sync community, a method for replicating a replica in the sync community, the method comprising a first replica performing:

receiving a knowledge vector from a second replica in a sync community, wherein the knowledge vector from the second replica is a shorthand representation of collective knowledge of the second replica and represents changes to data that the second replica is aware of, the knowledge vector from the second replica including one or more change IDs, each change ID including a replica ID and a change number, each change ID uniquely identifying a change that has occurred to data of an object within the sync community;

comparing the knowledge vector representing the collective knowledge of the second replica with a knowledge vector of the first replica to identify changes on the first replica that are not known by the second replica, the knowledge vector of the first replica being a shorthand representation of collective knowledge of the first replica and representing changes to data that the first replica is aware of, the knowledge vector of the first replica including one or more change IDs, each change ID including a replica ID and a change number, each change ID uniquely identifying a change that has occurred to data of an object within the sync community; and sending the identified changes to the second replica, wherein a change is identified if its corresponding change ID is found in the knowledge vector of the first replica but is not found in the knowledge vector of the second replica.

2. A method as defined in claim 1, further comprising sending the knowledge vector of the first replica to the second replica.

3. A method as defined in claim 1, further comprising receiving changes from the second replica, wherein the second replica identified the changes by comparing the knowledge vector of the first replica with in the knowledge vector of the second replica.

4. A method as defined in claim 1, wherein comparing the knowledge vector representing the collective knowledge of the second replica with a knowledge vector of the first replica to identify changes on the first replica that are not known by the second replica further comprises performing conflict detection.

5. A method as defined in claim 4, wherein performing conflict detection further comprises:
receiving a first made-with-knowledge value from the second replica, wherein the first made-with-knowledge value is associated with a first change and represents changes that the replica that assigned the first made-with-knowledge value was aware of when the first made-with-knowledge value was assigned;
sending a second made-with knowledge value to the second replica, wherein the second made-with-knowledge value is associated with a second change and represents changes the replica that assigned the second made-with-knowledge value was aware of when the second made-with-knowledge value was assigned; and
determining that a conflict exists if a change ID of the first change is not included in the second made-with-knowledge value and a change ID of the second change is not included in the first made-with-knowledge value.

6. A method as defined in claim 1, further comprising updating a knowledge vector of the second replica.

7. A method as defined in claim 6, further comprising storing an exception list that includes change IDs that correspond to changes received from the first replica.

8. A method as defined in claim 7, wherein each change ID includes a replica ID that is associated with a particular replica in the sync community and a version.

9. In a sync community that includes a plurality of replicas, wherein each replica is able to make changes to data independently of other replicas in the sync community, a method for replicating a replica in the sync community, the method comprising:
maintaining a first knowledge at a first replica, wherein the first knowledge is represented by a first knowledge vector as a shorthand representation of collective knowledge of the first replica, wherein the first knowledge includes change IDs, each change ID including a replica ID and a change number, each change ID uniquely identifying a change that has occurred to data of an object within the sync community;
enumerating changes at the first replica that are not known at a second replica by comparing a second knowledge vector of the second replica with the first knowledge vector of the first replica, the second knowledge vector being a shorthand representation of collective knowledge of the second replica, the second knowledge including change IDs, each change ID including a replica ID and a change number, each change ID uniquely identifying a change that has occurred to data of an object within the sync community, wherein a change is identified if its corresponding change ID is found in the first knowledge vector but is not found in the second knowledge vector; and
sending the enumerated changes to the second replica.

10. A method as defined in claim 9, further comprising receiving changes from the second replica that the second replica enumerated by comparing the first knowledge with the second knowledge.

11. method as defined in claim 9, further comprising detecting conflicts between the first replica and the second replica by:
determining whether the first replica was aware of a change made to a particular item by the second replica when the first replica made a separate change to the particular item; and
determining whether the second replica was aware of the separate change made to the particular item by the first replica when the second replica made the change to the particular item.

12. A method as defined in claim 9, wherein maintaining a first knowledge at a first replica further comprises including made-with-knowledge values in the first knowledge, wherein each made-with-knowledge value is associated with a certain change and each made-with-knowledge value identifies changes that the replica that assigned the made-with-knowledge value was aware of when the made-with-knowledge value was associated with the certain change.

13. A method as defined in claim 9, further comprising updating the second knowledge to reflect changes received from the first replica and applied to the second replica.

14. A method as defined in claim 9, further comprising including an exception list in the first knowledge during replication such that changes received by the second replica are included in the second knowledge if the replication is not completed.

15. A method as defined in claim 14, further comprising representing the knowledge as a knowledge vector.

16. A method as defined in claim 14, further comprising replicating a replica through a surrogate replica such that all changes made by the replica have a change ID assigned by the surrogate replica.

17. A computer program product having computer-executable instructions for performing the method of claim 9.

18. In a sync community that includes one or more replicas, a method for replicating the one or more replicas such that each replica does not have to be aware of all replicas in the sync community or of a topology of the sync community, the method comprising a replica performing:
storing a knowledge vector at the replica, the knowledge vector being a shorthand representation of collective knowledge of the replica, wherein the knowledge vector includes one or more change IDs that represent changes the replica knows, the one or more change IDs each including a replica ID and a corresponding change identification number, each change ID uniquely identifying a change that has occurred to data of an object within the sync community;
during replication, comparing the knowledge vector with a knowledge vector of a second replica to identify first changes that the second vector does not know, the knowledge vector of the second replica being a shorthand representation of collective knowledge of the second replica and including one or more change IDs which each include a replica ID and a corresponding change identification number, each change ID uniquely identifying a change that has occurred to data of an object within the sync community, wherein replication also compares the knowledge vectors to identify second changes at the second replica that the first replica does not know;

sending the first changes to the second replica; and receiving the second changes from the second replica.

19. A method as defined in claim 18, further comprising including made-with-knowledge values in the knowledge vector such that the replica can determine if a particular change at the replica is in conflict with a change on the second replica.

20. A method as defined in claim 18, further comprising updating the knowledge vector after replication.

21. A method as defined in claim 18, further comprising including an exception list in the knowledge vector, wherein each entry in the exception list corresponds to a change received from the second replica.

22. A method as defined in claim 21, further comprising updating the knowledge vector when a change occurs at the first replica.

23. In a sync community that includes one or more replicas that replicate data, a method for detecting conflicts during replication between a first replica and a second replica in the sync community, the method comprising:

storing a first plurality of changes at a first replica, wherein each change in the first plurality of changes is associated with a change ID that uniquely identifies a change that has occurred to data of an object within the sync community and a made-with knowledge value, the made-with-knowledge value indicating any changes on a second replica which were known to the first replica when the respective change was made on the first replica;

receiving a second plurality of changes from the second replica, wherein each change in the second plurality of changes is associated with a change ID that uniquely identifies a change that has occurred to data of an object within the sync community and a made-with-knowledge value, the made-with-knowledge value of the second replica indicating any changes on the first replica which were known to the second replica when the respective change was made on the second replica;

comparing the made-with-knowledge values of the second plurality of changes with the first plurality of changes to determine if a particular change in the first plurality of changes was made with knowledge of changes in the second plurality of changes;

comparing the made-with-knowledge values of the first plurality of changes with the second plurality of changes to determine if a particular change in the second plurality of changes was made with knowledge of changes in the first plurality of changes; and detecting a conflict if any of the first plurality of changes was made without knowledge of changes in the second plurality of changes and if any of the second plurality of changes was made without knowledge of changes in the first plurality of changes.

24. A method as defined in claim 23, further comprising resolving the conflict in favor of a change stored on a server.

25. A method as defined in claim 23, further comprising deciding the conflict following a deterministic rule.

26. A method as defined in claim 23, further comprising deciding the conflict in favor of a change that was made chronologically later in time.

27. A method as defined in claim 23, further comprising performing a conflict resolution that merges portions of changes together.

28. A computer program product having computer-executable instructions for performing the method of claim 23.

29. In a sync community that includes a plurality of replicas, wherein each replica is able to make changes to data independently of other replicas in the sync community, a computer program product for implementing a method for replicating a replica in the sync community, the computer program product comprising:

a computer-readable medium having computer executable instructions for performing the method, the method comprising:

receiving a knowledge vector from a second replica in a sync community, wherein the knowledge vector from the second replica is a shorthand representation of collective knowledge of the second replica and represents changes to data that the second replica is aware of, the knowledge vector from the second replica including one or more change IDs, each change ID including a replica ID and a change number, each change ID uniquely identifying a change that has occurred to data of an object within the sync community;

comparing the knowledge vector representing the collective knowledge of the second replica with a knowledge vector of the first replica to identify changes on the first replica that are not known by the second replica, the knowledge vector of the first replica being a shorthand representation of collective knowledge of the first replica and representing changes to data that the first replica is aware of, the knowledge vector of the first replica including one or more change IDs, each change ID including a replica ID and a change number, each change ID uniquely identifying a change that has occurred to data of an object within the sync community; and sending the identified changes to the second replica, wherein a change is identified if its corresponding change ID is found in the knowledge vector of the first replica but is not found in the knowledge vector of the second replica.

30. A computer program product as defined in claim 29, wherein receiving a knowledge vector from a second replica in a sync community further comprises sending the knowledge vector of the first replica to the second replica.

31. A computer program product as defined in claim 29, wherein sending the identified changes to the second replica further comprises receiving other changes from the second replica, wherein the second replica identified the other changes by comparing the knowledge vector of the first replica with the knowledge vector of the second replica.

32. A computer program product as defined in claim 29, wherein comparing the knowledge vector of the second replica with a knowledge vector of the first vector to identify changes on the first replica that are not known by the second replica further comprises performing conflict detection.

33. A computer program product as defined in claim 32, wherein performing conflict detection further comprises:

receiving a first made-with-knowledge value from the second replica, wherein the first made-with-knowledge value is associated with a first change and represents changes that the second replica was aware of when the first change was made;

sending a second made-with knowledge value to the second replica, wherein the second made-with-knowledge value is associated with a second change and represents changes the first replica was aware of when the second change was made; and determining that a conflict exists if a change ID of the first change is not included in the second made-with-knowledge value and a change ID of the second change is not included in the first made-with-knowledge value.

34. A computer program product as defined in claim 29, further comprising updating a knowledge vector of the first replica.

35. A computer program product as defined in claim 34, further comprising storing an exception list that includes change IDs that correspond to changes received from the second replica.

36. A computer program product as defined in claim 35, wherein each change ID includes a replica ID that is associated with a particular replica in the sync community and a version.

\* \* \* \* \*